United States Patent [19]
Saito

[11] Patent Number: 5,992,392
[45] Date of Patent: Nov. 30, 1999

[54] ENGINE FUEL SUPPLY SYSTEM

[75] Inventor: Chitoshi Saito, Hamamatsu, Japan

[73] Assignee: Sanshin Kogyo Kabushiki Kaisha, Hamamatsu, Japan

[21] Appl. No.: 08/932,330

[22] Filed: Sep. 17, 1997

[30] Foreign Application Priority Data

Sep. 17, 1996 [JP] Japan .................................. 8-244505
Mar. 3, 1997 [JP] Japan .................................. 9-047662

[51] Int. Cl.⁶ .................................................. F02M 37/04
[52] U.S. Cl. ...................... 123/508; 123/509; 123/41.31
[58] Field of Search ................................. 123/509, 508, 123/495, 197.4, 41.31

[56] References Cited

U.S. PATENT DOCUMENTS

| | | | |
|---|---|---|---|
| 1,963,658 | 6/1934 | Ford | 123/509 |
| 2,000,555 | 5/1935 | Becker | 123/508 |
| 4,054,108 | 10/1977 | Gill | 123/509 |
| 4,412,513 | 11/1983 | Obermayer et al. | 123/509 |
| 4,795,001 | 1/1989 | Nakahama et al. | |
| 4,811,717 | 3/1989 | Nakahama | |
| 4,909,226 | 3/1990 | Nakahama | |
| 5,117,796 | 6/1992 | Tursky | 123/509 |
| 5,255,643 | 10/1993 | Mochizuki et al. | |
| 5,438,962 | 8/1995 | Iwata et al. | |
| 5,438,968 | 8/1995 | Johnson et al. | 123/467 |
| 5,511,956 | 4/1996 | Hasegawa et al. | |
| 5,701,872 | 12/1997 | Kaku et al. | |

*Primary Examiner*—Thomas N. Moulis
*Attorney, Agent, or Firm*—Knobbe, Martens, Olson & Bear LLP

[57] ABSTRACT

A fuel supply system includes a fuel pump for providing fuel from a fuel source to an electrically operated fuel injector for injection into a combustion chamber of an engine. The fuel pump has a follower driven pumping element. The follower is actuated by a cam element, with movement of the cam element powering the follower, effecting pumping by the pump. The cam element is rotated by a crankshaft of the engine.

2 Claims, 14 Drawing Sheets

ENGINE FUEL SUPPLY SYSTEM

FIELD OF THE INVENTION

The present invention is a fuel supply system for an internal combustion engine. More particularly, the invention is a fuel supply system having a cam operated high pressure fuel pump.

BACKGROUND OF THE INVENTION

Internal combustion engines operating on a two-cycle principal have traditionally been arranged so that fuel is delivered into an incoming air supply. The fuel and air mixture passes into a crankcase chamber for crankcase compression, and is then delivered through a scavenge passage to a combustion chamber of the engine for combustion therein.

As is well known, in the operating cycle of a two-cycle engine, an exhaust port leading from the combustion chamber is open during at least part of the time the scavenge passage is open. Thus, exhaust along with a portion of the air and fuel charge delivered through the scavenge passage flows through the exhaust port into the exhaust system.

In this arrangement, and especially at low engine speeds, a large amount of fuel must be added to the air to compensate for the flow of fuel through the cylinder and directly out the exhaust port. Supplying excessive fuel, however, is costly and can result in stalling of the engine. In addition, the quantities of fuel flowing into the exhaust may foul a catalyst positioned in the exhaust system.

As one attempt to solve the above-stated problems, some two-cycle engines are arranged to have fuel directly injected into the combustion chamber. A fresh air charge is supplied to each combustion chamber through the crankcase and a scavenge port Once air is supplied to the combustion chamber and the exhaust port is closed, a fuel injector injects fuel directly into the combustion chamber for mixing with the air.

This arrangement has the benefit that little of the fuel flows unburned into the exhaust system, and the amount of fuel supplied to each combustion chamber may be closely controlled. On the other hand, in order for this system to work, fuel must be supplied to the fuel injector under high pressure. Thus, these systems have a fuel supply which includes a fuel tank and a high pressure pump for pumping fuel from the tank and supplying it under high pressure to the fuel injector.

In some instances, mechanically driven pumps have been used for this purpose. In these situations, fuel is delivered to an injector which injects fuel into the combustion chamber when the pressure in a pressure circuit exceeds a predetermined pressure. This arrangement is very complex and does not permit complete control over the timing of the injector.

More commonly, the high pressure pump is electrically operated. These pumps, however, require complex circuitry for their control. When the engine is used, for example, to power an outboard motor, the circuitry consumes precious space within the motor cowling.

A fuel supply system for delivering fuel from a fuel source to a combustion chamber of an engine through a fuel injector at high pressure and without the above-stated problems is desired.

SUMMARY OF THE INVENTION

In accordance with the present invention, there is provided an improved fuel supply system including a fuel pump for supplying fuel from a fuel source, such as a fuel tank, to a solenoid operated fuel injector for injection into a combustion chamber of the engine.

The pump has a follower-driven pumping element The follower is actuated by a cam element. The cam element is rotated by a crankshaft of the engine. In a first preferred embodiment, the cam element is mounted directly on the crankshaft of the engine. In a second preferred embodiment, the cam element is mounted on a drive shaft positioned remote from the crankshaft. In this embodiment, the drive shaft is preferably drive by a flexible transmitter extending in engagement with a pulley connected to the crankshaft and a pulley connected to the drive shaft.

Further objects, features, and advantages of the present invention over the prior art will become apparent from the detailed description of the drawings which follows, when considered with the attached figures.

DETAILED DESCRIPTION OF THE PREFERRED EMBODIMENTS

Figure 1:
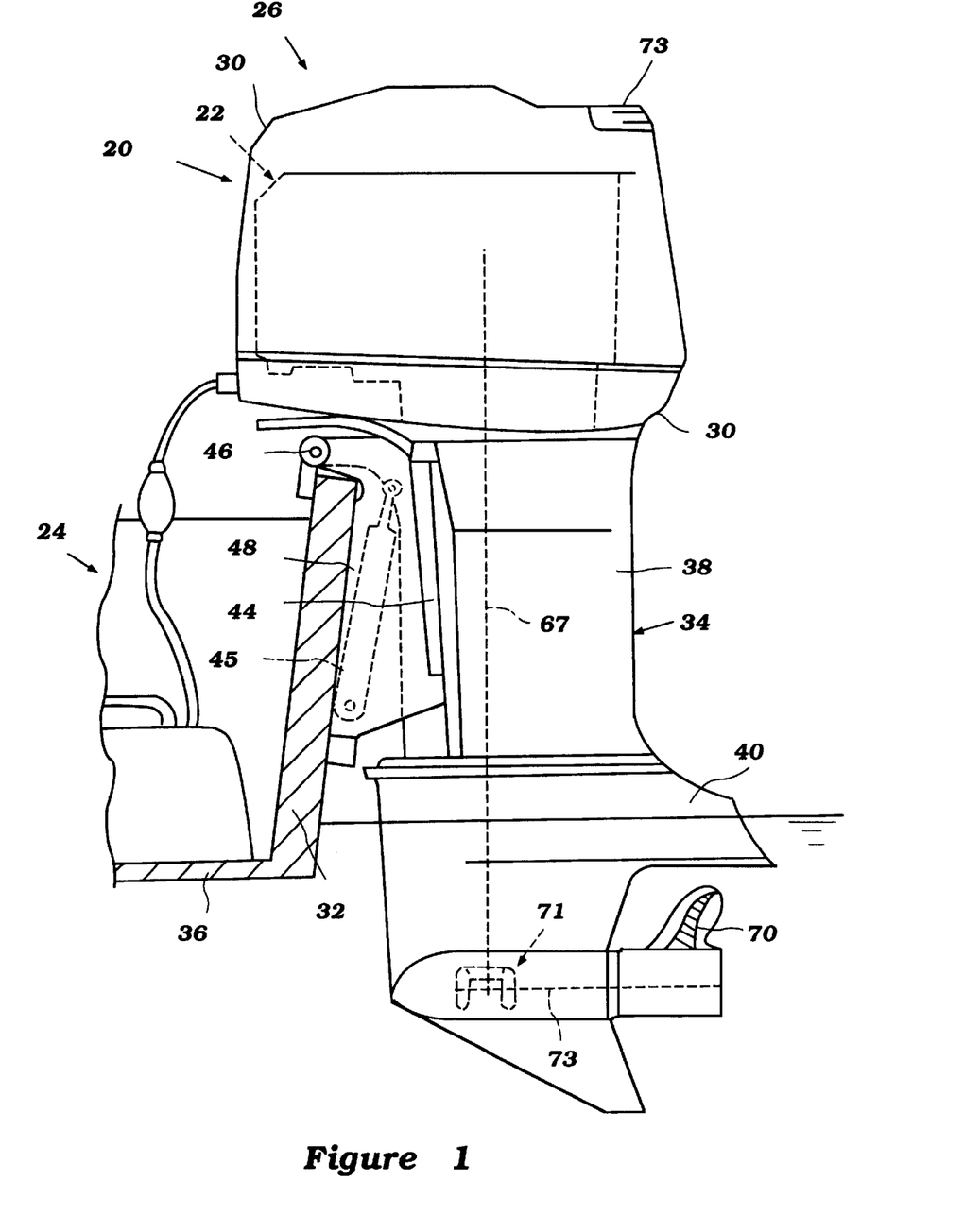
FIG. 1 is a side view of an outboard motor propelling a watercraft, illustrated partially and in cross-section, the motor powered by an engine of the type with which the fuel supply system of the present invention is useful.
Figure 12:
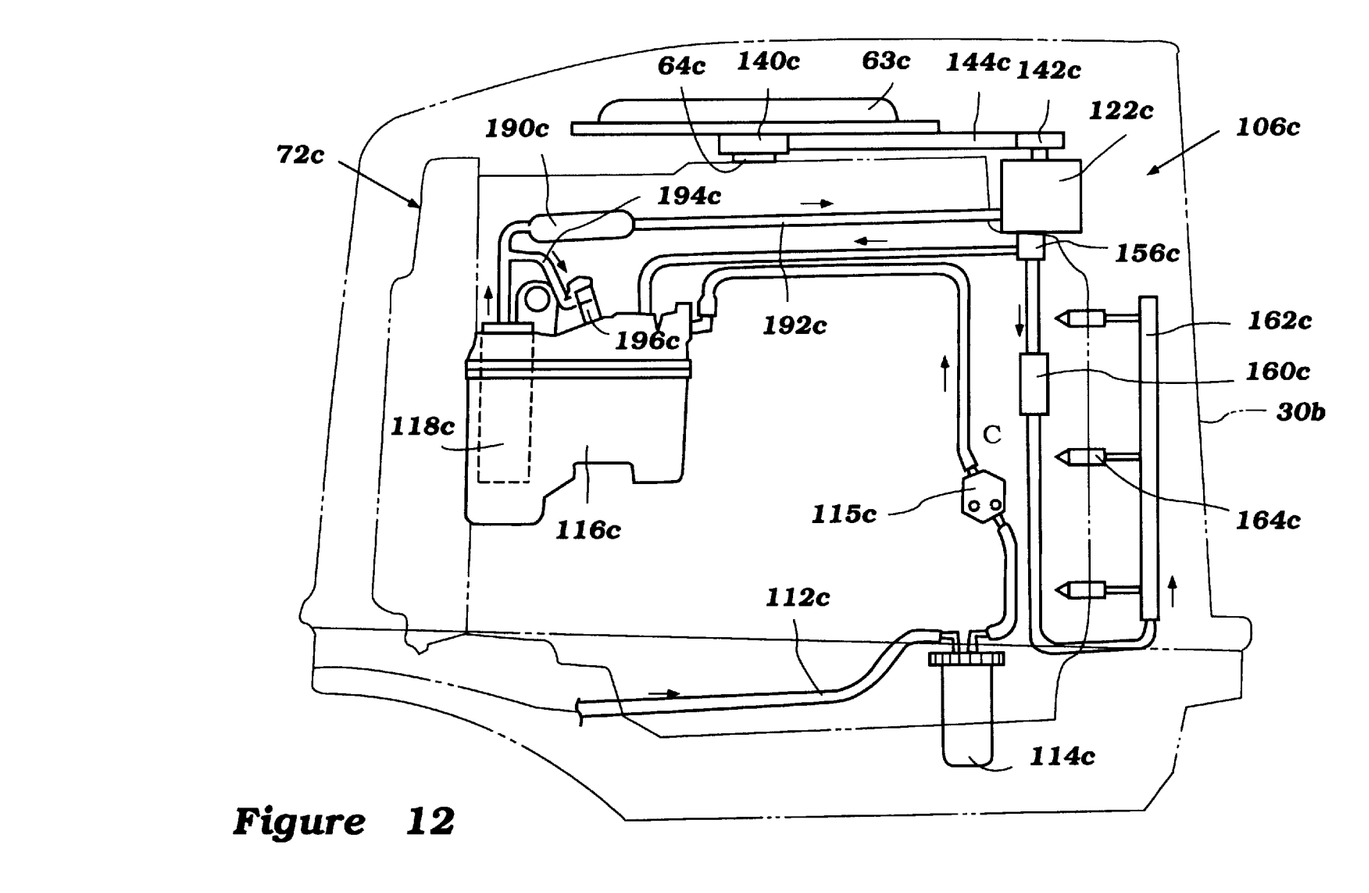
FIG. 12 is a side view of an engine positioned within a cowling (illustrated in phantom) of an outboard motor, the engine having a fuel supply system in accordance with a fourth embodiment of the present invention.

Referring to FIG. 1, there is illustrated an engine 22 of the type with which the fuel supply system of the present invention is useful. As illustrated in FIG. 12, the engine 22 may be used to power an outboard motor 20. The engine 22 having the fuel supply system is described for use with an outboard motor 20 since this particular application is with which the engine 22 described is particularly useful. It should be understood, however, that the engine 22 which is supplied with fuel with the fuel supply system arranged as described may be used in other applications.

As illustrated in FIG. 12, the outboard motor 20 is of the type utilized to propel a watercraft 24. The outboard motor 20 has a powerhead area 26 comprised of a lower tray portion 28 and a main cowling portion 30. The motor 20 includes a lower unit 34 extending downwardly from the cowling portion 30. The lower unit 34 comprises an upper or "drive shaft housing" section 38 and a lower section 40.

The powerhead area 26 of the motor 20 is connected to a steering shaft (not shown). The steering shaft is supported for steering movement about a vertically extending axis within a swivel or steering bracket 44. The swivel bracket 44 is connected by means of a pivot pin 46 to a clamping bracket 48 which is attached to a transom portion 32 of a hull 36 of the watercraft 24. The pivot pin 46 permits the outboard motor 20 to be trimmed and tilted up about the horizontally disposed axis formed by the pivot pin 46. An oil filled cylinder 45 may be used to assist in this movement.

The engine 22 is positioned within the cowling 30 of the motor 20. As best illustrated in FIG. 1, 2, 5 and 6, the Engine 22 is preferably of the six-cylinder variety, operating on a two-cycle principle, and arranged in "V" fashion. In this arrangement, the engine 22 has a cylinder block 50 with a pair of cylinder heads 52 connected thereto. Each cylinder head 52 cooperates with the block 50 to define three cylinders 54. A combustion chamber 56 is defined within each cylinder 54, preferably partly by a recessed area within the cylinder head 52.

It should be understood that the fuel supply system of the present invention is useful with engines arranged in other orientations and containing other than six cylinders.

Figure 2:
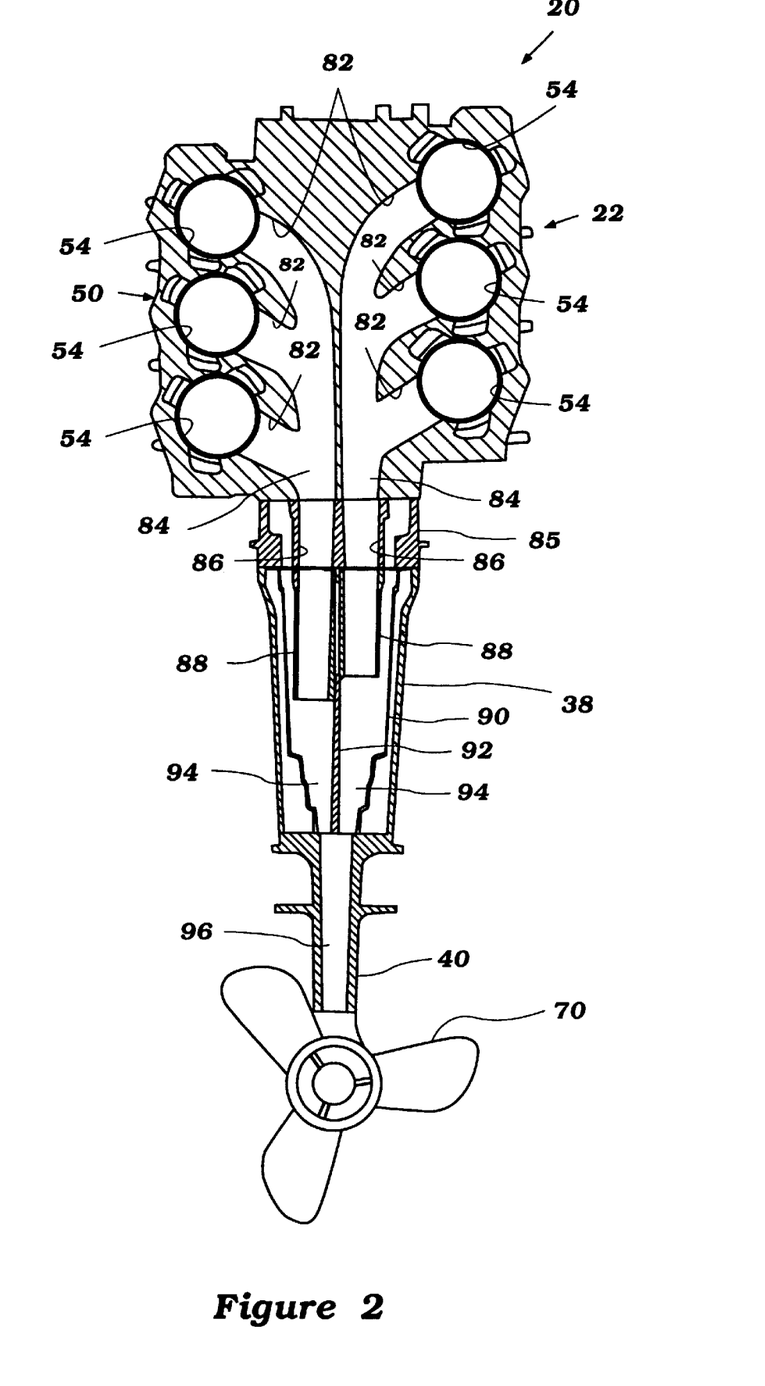
FIG. 2 is a cross-sectional view of the engine powering the motor illustrated in FIG. 1.
Figure 3:
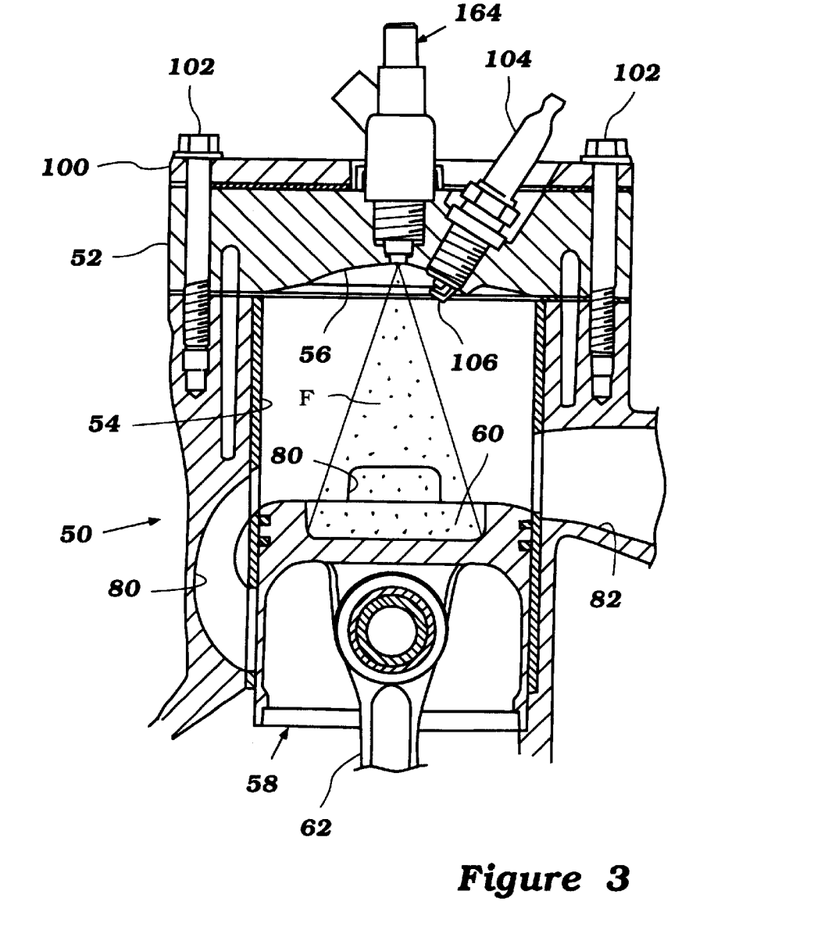
FIG. 3 is an enlarged cross-sectional view of a cylinder of the engine illustrated in FIG. 1.
Figure 5:
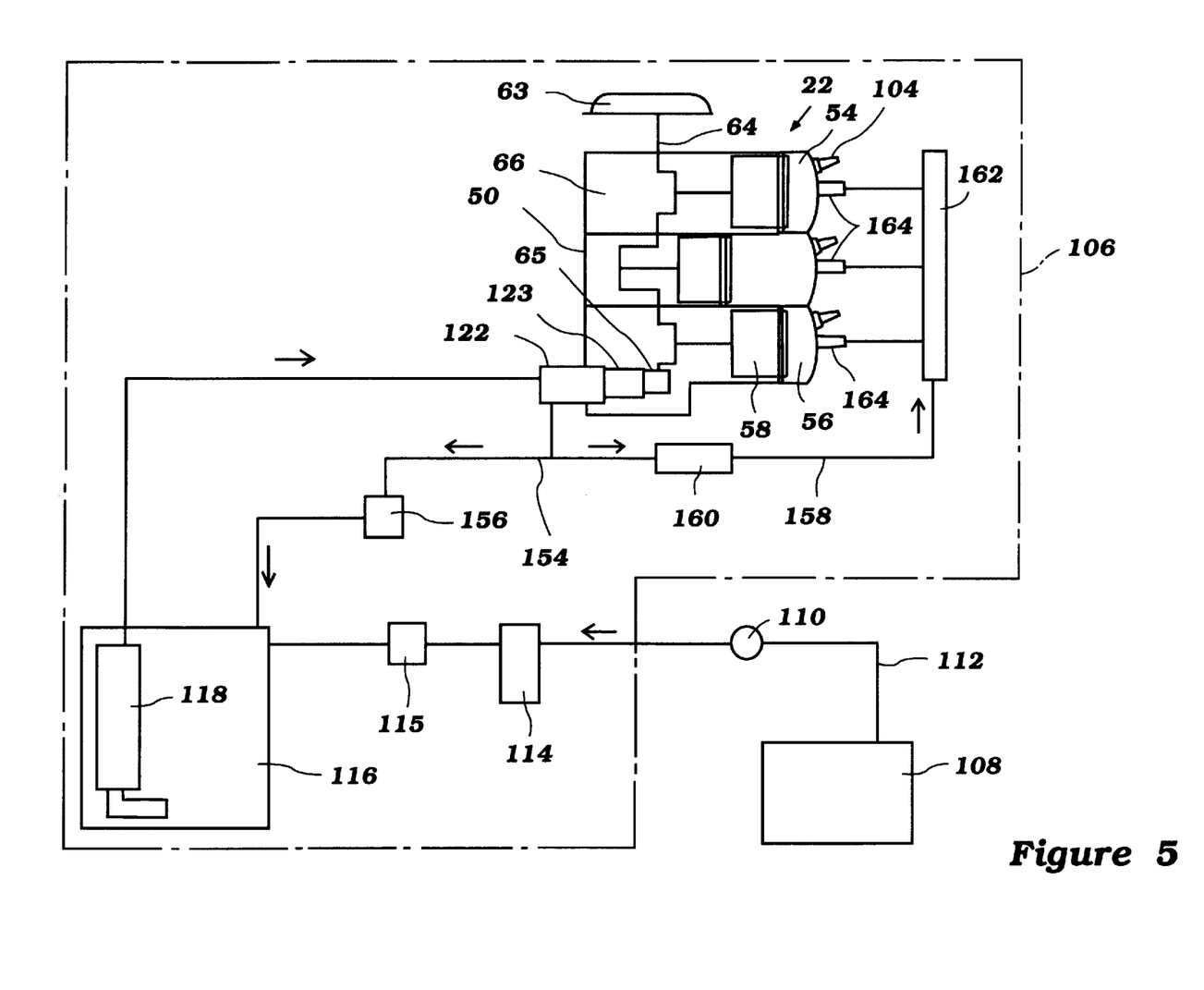
FIG. 5 is a schematic illustrating a fuel supply system in accordance with a first embodiment of the present invention.

Referring to FIGS. 2, 3 and 5, a piston 58 is movably mounted within each cylinder 54. The piston 58 preferably has a recessed top surface area 60 of a shape know to those skilled in the art for inducing fuel and air mixing within the cylinder 54. The piston 58 is connected by a connecting rod 62 to a crankshaft 64. The crankshaft 64 is rotatably mounted in a crankcase 66 defined by the engine block 50 and a crankcase cover 68 connected thereto. Preferably, a flywheel 63 is connected to a top end of the crankshaft 64 extending out of the engine 20.

As illustrated in FIG. 1, the engine 22 is preferably mounted within the cowling 30 so that its cylinders 54 are generally horizontally extending. So arranged, the crankshaft 64 is generally vertically extending. Though not shown, the crankshaft 64 is arranged to drive a means for propelling the watercraft. Preferably, this means comprises a propeller 70.

In this arrangement, the crankshaft 64 is connected to a top end of a drive shaft 67 which extends downwardly through the lower unit 34, where it drives a bevel gear and a conventional forward-neutral-reverse transmission 71. A control (not shown) is preferably provided for allowing an operator to remotely control the transmission from the watercraft 24.

The transmission drives a propeller shaft 73 which is journalled within the lower section 40 of the lower unit 34 in a known manner. A hub of the propeller 70 is coupled to the drive shaft, rotation of the propeller moving water which effectuates movement of the watercraft 24.

As illustrated in FIG. 3, the engine 22 includes an intake system 72 for providing air to each cylinder 54. Air is drawn from outside the cowling 30 of the motor through an vent 73 and into an inlet of the intake system 72. Air passing through the air intake is divided and passes through a passage 74 (such as defined in a throttle body and runner) corresponding to each cylinder 54.

Means are provided for controlling the flow rate of air to each cylinder 54. Preferably, this means comprises a throttle valve 76 movably positioned in each passage. Each valve 76 preferably comprises a butterfly-type valve which is controlled remotely by the operator of the watercraft 24.

Each intake passage 74 leads to a chamber within the crankcase 66 corresponding to one of the cylinders 54. A reed-valve 78 is preferably provided in each intake passage 74 for permitting only one-way passage of the air into each crankcase chamber.

As stated above, the engine 22 operates on the well known two-cycle principle. As such, during a crankcase compression cycle, air within the crankcase chamber is compressed and flows through one or more scavenge passages 80 leading from the chamber into the cylinder 54.

As described in more detail below, a fuel supply system provides fuel to each cylinder 54 for combustion therein with the air supplied as stated above.

Referring again to FIG. 1, exhaust generated during the combustion process is routed from each cylinder 54 through an exhaust port 82. Each exhaust port 82 comprises a passage leading through the engine block 50 from cylinder 54. Each exhaust port 82 for the cylinders 54 of each bank join into a common exhaust passage 84. These common exhaust passages 84 lead downwardly to the bottom end of the engine 22.

Means are provided for routing the exhaust from the bottom of the engine 22 to a point external to the motor 20. Preferably, the engine 22 is positioned above an exhaust guide 86 within the motor 20. A pair of passages 86 extend through the exhaust guide 85 corresponding to the common exhaust passages 84 leading through the engine 22.

A muffler 90 is positioned in the upper section 38 of the lower unit 34. An exhaust pipe 88 extends down from each passage 86 through the exhaust guide 85 into the muffler 90 for directing the exhaust into the muffler 90. Exhaust from each exhaust pipe 88 is kept separate by a divider 92, with the exhaust from each exhaust pipe 88 directed into one of two exhaust expansion areas 94 defined within the muffler 90. The exhaust is routed from the muffler 90 through an exhaust passage 96 extending through the lower section 40 of the lower unit 40 to a through the hub exhaust discharge, as is well known in the art.

As illustrated in FIG. 2, a cover 100 extends over each cylinder head 52. Bolts 102 or other fasteners are used to connect the cover 100, head 52 and block 50.

Still referring to FIG. 2, means are provided for igniting the air and fuel supplied to each cylinder 54. Preferably, this means comprises a spark plug 104 having its electrode 106 positioned within the combustion chamber 56 of the cylinder 54. An ignition circuit, as is known to those skilled in the art, is provided for inducing a spark at the electrode tip 106 of the spark plug 104 at a determined time for ignition an air and fuel mixture within the cylinder 54.

Figure 4:
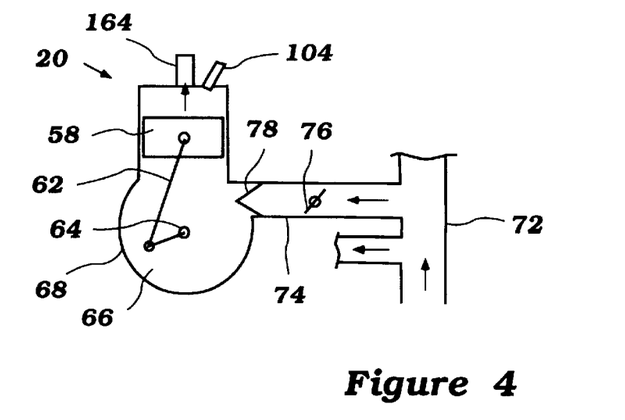
FIG. 4 is a schematic illustrating the arrangement of the engine illustrated in FIG. 1.

In accordance with a first embodiment of the present invention, and as best illustrated in FIG. 4, a fuel supply system 106 provides fuel to each cylinder 54 for combustion therein. The fuel supply system 106 draws fuel from a fuel supply or source, such as a fuel tank 108 or reservoir. As illustrated, the tank 108 is positioned within the hull 36 of the watercraft 24. A first low pressure or primer type pump 110 is positioned along a fuel delivery line 112 leading from the tank 108. The delivery line 112 leads to a fuel filter 114, and thereon to a second low pressure pump 115 and then a vapor separator 116. Preferably, the second pump 114 is of the electrically operated variety.

The vapor separator 116 is utilized to remove air from the fuel, as is known in the art. The fuel is then pumped by a first or pre-pressurizing pump 118 through a line 120 to a high pressure pump 122. The pump 118 is preferably of the electrically-operated type and positioned within the vapor separator 116. The first pump 118 pressurizes the fuel to a first pressure above the pressure of the fuel within the vapor separator 116.

Figure 6:
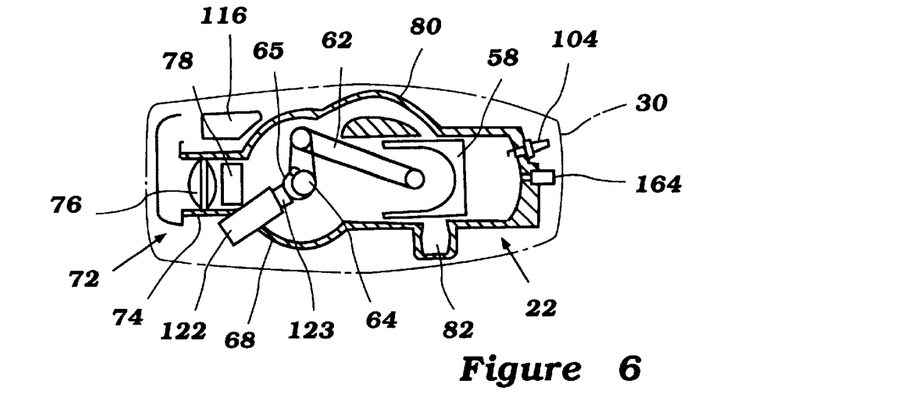
FIG. 6 is a cross-section view of the engine illustrated in FIG. 1 and having the fuel system in accordance with a first embodiment of the present invention, showing a pump arrangement of the fuel system.

Means are provided for driving the high pressure pump 122. As illustrated in FIGS. 4–6, this means preferably comprises interengaging surfaces of the crankshaft 64 and a drive part of the pump 122. In this arrangement, the pump 122 is of the plunger-type, having tappet or follower member 123 extending therefrom. The follower 123 is arranged to move in and out, and is connected to a pumping element (such as a piston in a chamber of the pump) for pumping fuel at high pressure.

In the embodiment illustrated, the follower 123 is actuated by a cam element 65 positioned directly on the crankshaft 65. The pump 122 is thus mounted to the engine 20 such that its follower 123 extends into engagement with the cam element 65. As the crankshaft 64 rotates, the cam element 65, which has a peripheral surface which varies in radial distance from an axis of rotation, presses the follower 123 in and out, thus effecting a pumping of the fuel.

The pump 122 pressurizes the fuel to a second pressure above the first pressure and delivers it through a line. A portion of the fuel is diverted by a pressure activated valve 156 back to the vapor separator 116 through a line 154. Preferably, this valve 156 is a pressure-activated valve.

The remainder of the fuel is delivered through a main delivery line 158 through a fuel filter 160 to a high pressure fuel rail 162. A fuel injector 164 is provided corresponding to each cylinder 54, as illustrated in FIG. 3, and is arranged to spray fuel F into the cylinder 54. The fuel injector 164 is arranged to draw fuel from the fuel rail 162. The fuel injector 164 is preferably of the type which is electrically operated, such as with a solenoid and which, when a nozzle thereof is opened, high pressure fuel supplied to the injector 164 is atomized and sprayed into the cylinder 54.

In accordance with the fuel supply system 106 of the present invention the pump 118 pre-pressurizes the fuel, so that the high pressure pump 122 need not further pressurize the fuel in as great of a pressure rise to reach the desired fuel supply pressure.

More importantly, however, the pump 122 is driven directly by the engine 22 without the need for a complex electrical supply and control. In addition, the pump 122 is driven in direct relation to the speed of the engine 22, thus providing fuel at a rate generally corresponding to the needs of the engine 22.

Figure 7:
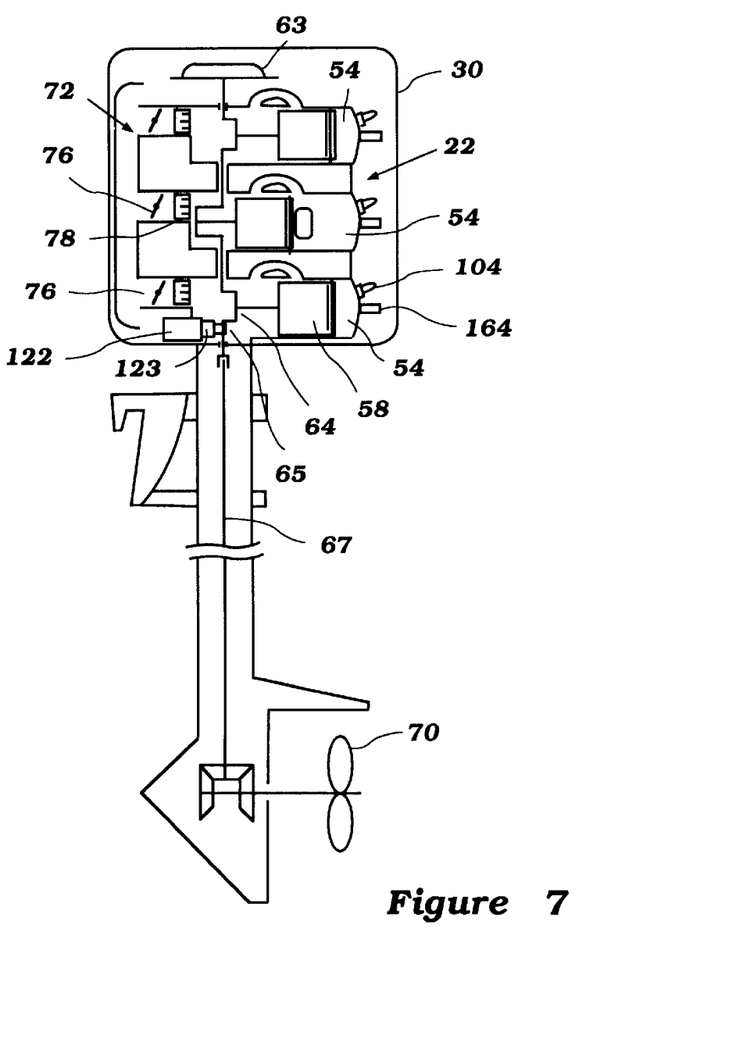
FIG. 7 is a cross-sectional view of an outboard motor powered by the engine illustrated in FIG. 1 and having the fuel system in accordance with a first embodiment of the present invention.
Figure 8:
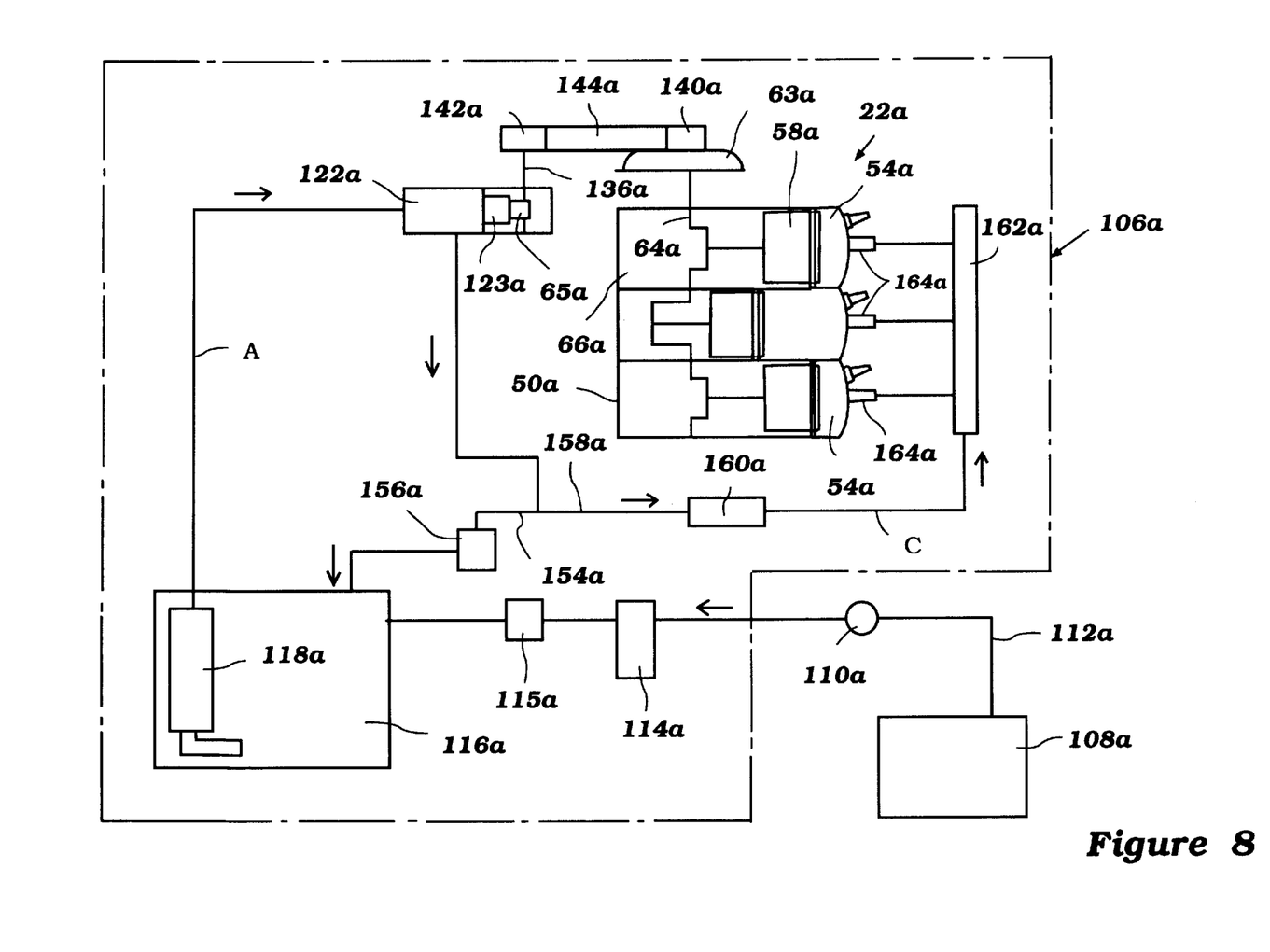
FIG. 8 is a schematic illustrating a fuel supply system in accordance with a second embodiment of the present invention.
Figure 9:
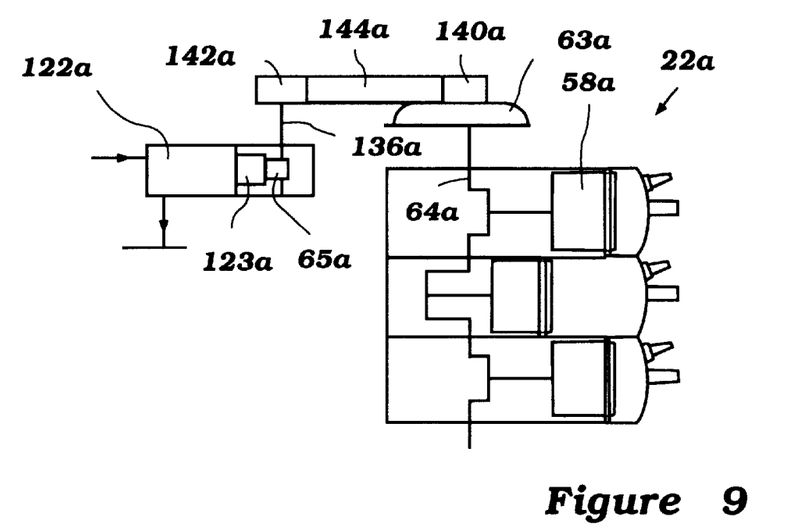
FIG. 9 is a schematic illustrating the interrelationship between a crankshaft of an engine and a pump of the fuel supply system in accordance with the second embodiment of the present invention.

A second embodiment fuel supply system 106a is illustrated in FIGS. 7–9. In the description and illustration of this embodiment, similar parts have been given like reference numerals to those used in the embodiment described above and illustrated in FIGS. 1–6, except that an "a" designator has been added thereto.

As illustrated, this embodiment system is similar to the last. In this embodiment, however, the pump 122a, while driven by the crankshaft 64a, is driven indirectly. As illustrated, the pump 122a is driven by a cam element 65a positioned on a shaft 136a. Means are provided for driving the shaft 136a with the crankshaft 64a. Preferably, this means comprise a pulley 140a mounted on the crankshaft 64a, a pulley 142a mounted on the shaft 136a, and a flexible transmitter, such as a belt 144a. The belt 144a is driven by the pulley 140a on the crankshaft 64a and drives the pulley 142a mounted on the shaft 136a.

Of course, as appreciated by one skilled in the art, other drive means may be used, such as interengaging gears or the like.

Figure 10:
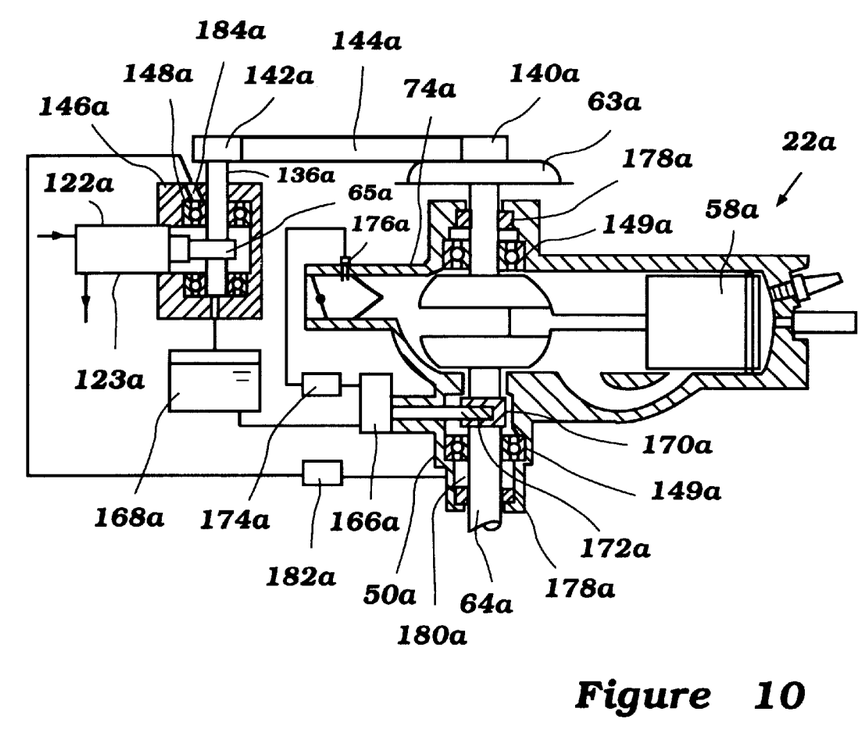
FIG. 10 is a cross-sectional view of an engine having the fuel supply system in accordance with the second embodiment of the present invention.

The drive arrangement for the high pressure pump 122a of this embodiment is illustrated in more detail in FIG. 10. As illustrated, the pump 122a is mounted to a housing 146a. The shaft 136a is rotatably mounted with respect to the housing 146a via one or more bearings 148a and arranged such that the cam element 65a thereon engages the tappet or follower 123a of the pump 122a.

As illustrated therein, the crankshaft 64a is rotatably mounted with respect to the engine block 50a by one or more bearings 149a.

As illustrated, a lubricant system may be provided for supplying lubricant, such as oil, to the engine 22a and the pump 122a. As illustrated, a lubricant pump 166a draws lubricant from a source or supply tank 168a. Preferably, the pump 166a is driven by the crankshaft 164a as well, with a drive gear 170a positioned on the crankshaft 64a driving a driven gear 172a of the pump 166a.

The pump 166a delivers lubricant through a check valve 174a, which may be pressure operated, and delivers it to the engine 22a through a port 176a in the intake passage 74a into the air passing therethrough. In addition, lubricant is supplied for lubricating the crankshaft 64a. Seals 178a are provided between the crankshaft 64a and the engine block 50a for preventing lubricant from leaking from the engine 22a.

A lubricant pool 180a is provided within the engine 22a. The lubricant flows through a check valve 182a from the pool 180a to a port 184a in the housing 146a for lubricating the pump 122a and shaft 136a. Lubricant is then returned to the reservoir or tank 168a through a drain passage.

Figure 11:
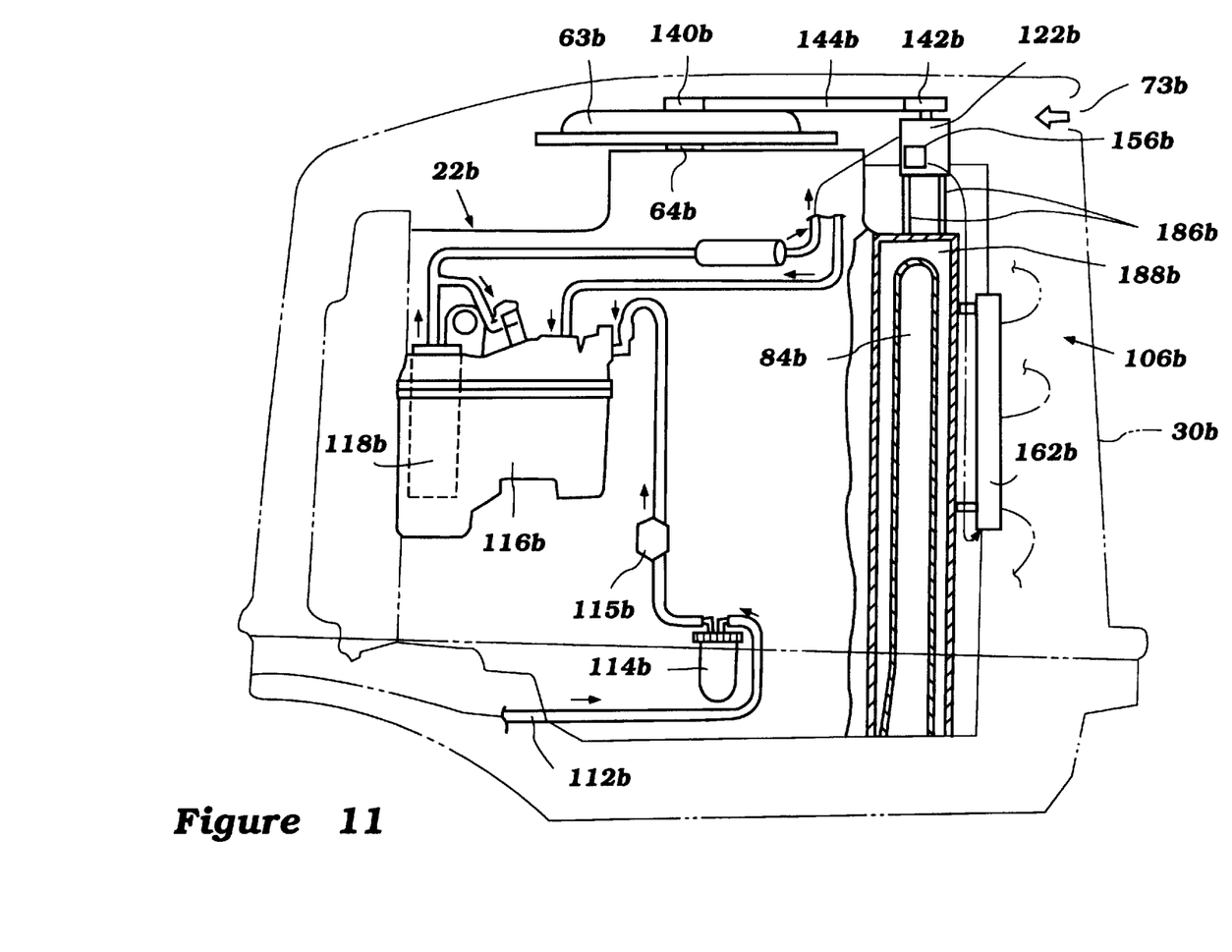
FIG. 11 is a side view, in partial cross-section, of an engine positioned within a cowling (illustrated in phantom) of an outboard motor, the engine having a fuel supply system in accordance with a third embodiment of the present invention.

A third embodiment fuel supply system 106b is illustrated in FIG. 11. In the description and illustration of this embodiment, similar parts have been given like reference numerals to those used in the above embodiments illustrated in FIGS. 1–10, except that a "b" designator has been added thereto.

In this embodiment, the pump 122b is cooled via coolant passing through a coolant jacket. Coolant flows into and out of the jacket through supply lines 186b leading to and from a coolant jacket 188b surrounding the exhaust passages 84b.

Figure 13:
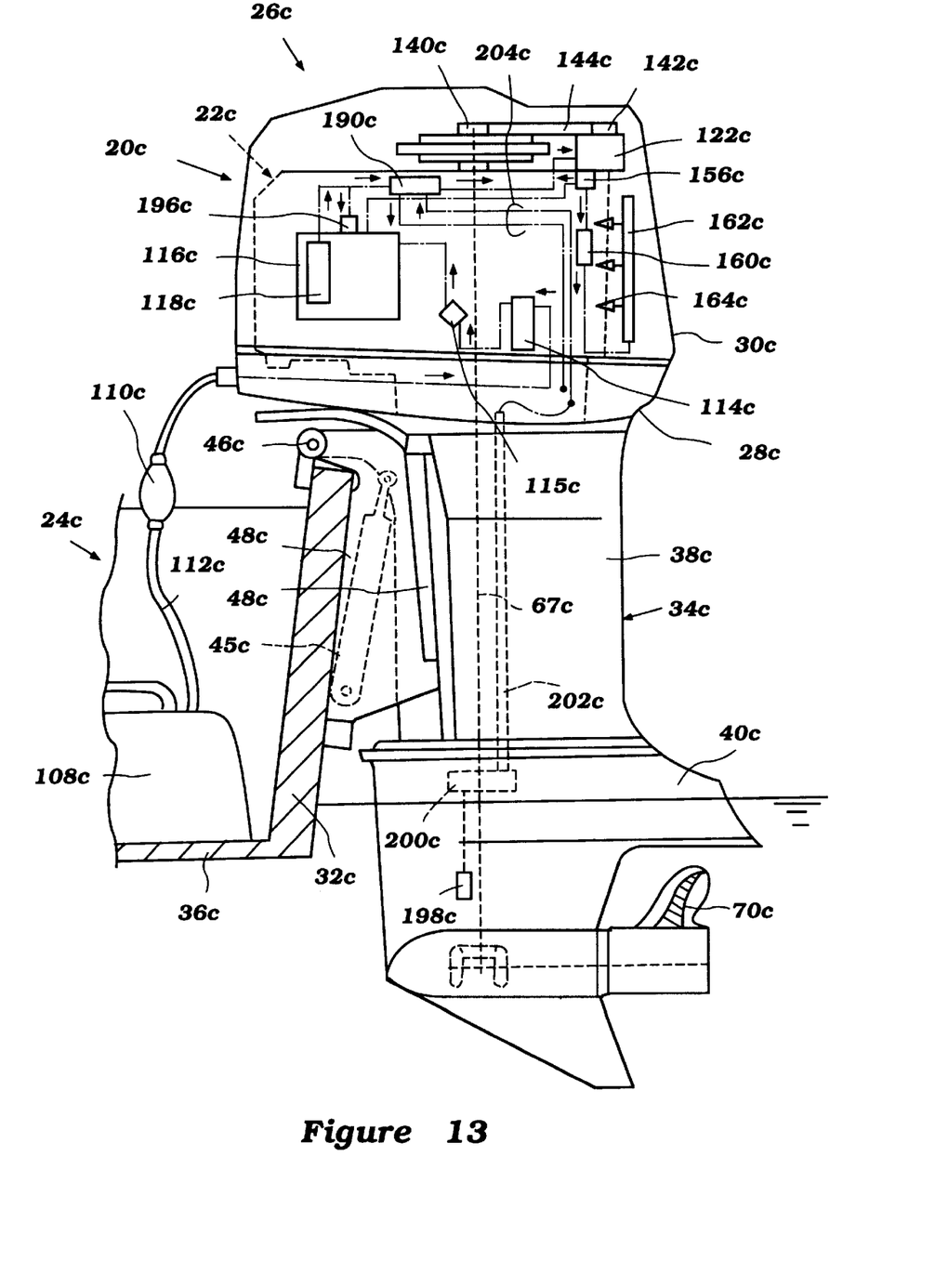
FIG. 13 is a side view of an outboard motor propelling a watercraft, illustrated partially and in cross-section, the outboard motor powered by an engine having the fuel system in accordance with the fourth embodiment of the present invention as illustrated in FIG. 11.

A fourth embodiment fuel supply system 106c is illustrated in FIGS. 12 and 13. In the description and illustration of this embodiment, similar parts have been given like reference numerals to those used in the above embodiments, except that a "c" designator has been added thereto.

This embodiment is similar to the first embodiment, as illustrated in FIG. 5, except that a fuel cooler 190c is provided along a fuel delivery line 192c between the pump 118c and the high pressure pump 122c. In addition, a portion of the fuel which is delivered by the pump 188c is return to the vapor separator 116c through a diverter line 194c as controlled by a valve 196c. This valve 196c is preferably pressure operated, like the valve 156c (described above in conjunction with the first embodiment).

The fuel cooling arrangement is illustrated in detail in FIG. 13. As illustrated therein, when the engine 22c is used to power an outboard motor 20c, coolant from the cooling system thereof is used to cool the fuel. In general, the motor 20c has a cooling system in which cooling water is drawn through an inlet 198c in the motor 20c by a pump 200c. The pump 200c is preferably powered off of the drive shaft 67c extending between the crankshaft of the engine 22c and the transmission. Water is delivered through a delivery line 202c to the fuel cooler 190c. This water is used to cool the fuel passing through the fuel cooler 190c, and then is drained back to the body of water in which the motor 20c is operating through a drain port 204c.

This arrangement has the advantage that the fuel is cooled before delivery to the fuel injectors 164c. Since the fuel is cooler, there is less risk that vapor will be introduced into the fuel during its pressurization by the high pressure pump. In addition, since most outboard motors have their engines already provided with a liquid cooling system, simply by diverting a small amount of this coolant to a fuel cooler, the fuel cooling advantages are achieved.

Illustrated in FIGS. 14–17 are several layouts for a fuel supply system in accordance with the present invention. The fuel supply systems of these embodiments have high pressure pumps which are driven remotely from the crankshaft of the engine, as described in detail in the embodiment illustrated in FIGS. 8–10, and further includes a fuel cooler as in the embodiment described above and illustrated in FIGS. 12 and 13.

Figure 14:
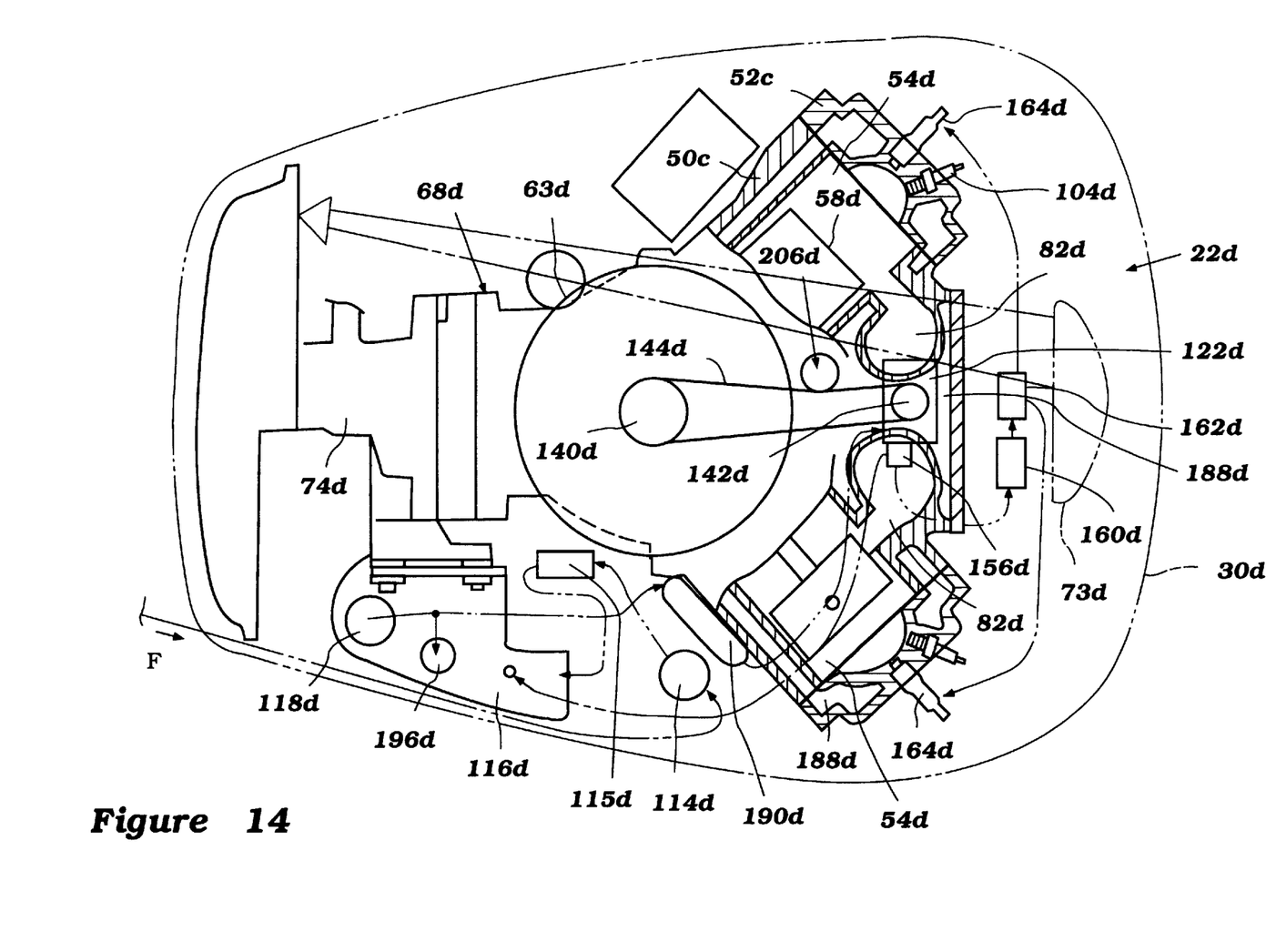
FIG. 14 is a top view of an engine positioned in a cowling (illustrated in phantom) of an outboard motor, the engine having a fuel supply system in accordance with a fifth embodiment of the present invention.

A first arrangement is illustrated in FIG. 14. In the description and illustration of this embodiment, like reference numerals have been utilized for like parts to those of the embodiments described and illustrated above, except than a "d" designator has been added thereto.

In this embodiment, the vapor separator 116d is connected to a mounting connected to an intake portion of the engine 20d. The pump 122d, however, is mounted generally in the valley portion of the engine 20d between its two banks of cylinders. As in the second embodiment, the pump 122d is driven remotely through a drive system including a pulley 140d on the crankshaft, a pulley 142d on a drive shaft, and a belt 144d extending therebetween. A tensioner pulley 206d is provided for maintaining the drive belt 144d in taunt condition.

This embodiment has the advantage that the pump 122d occupies space within the valley of the engine 22d and does not otherwise enlarge the dimensions of the engine, which is undesireable in the watercraft setting.

Figure 15:
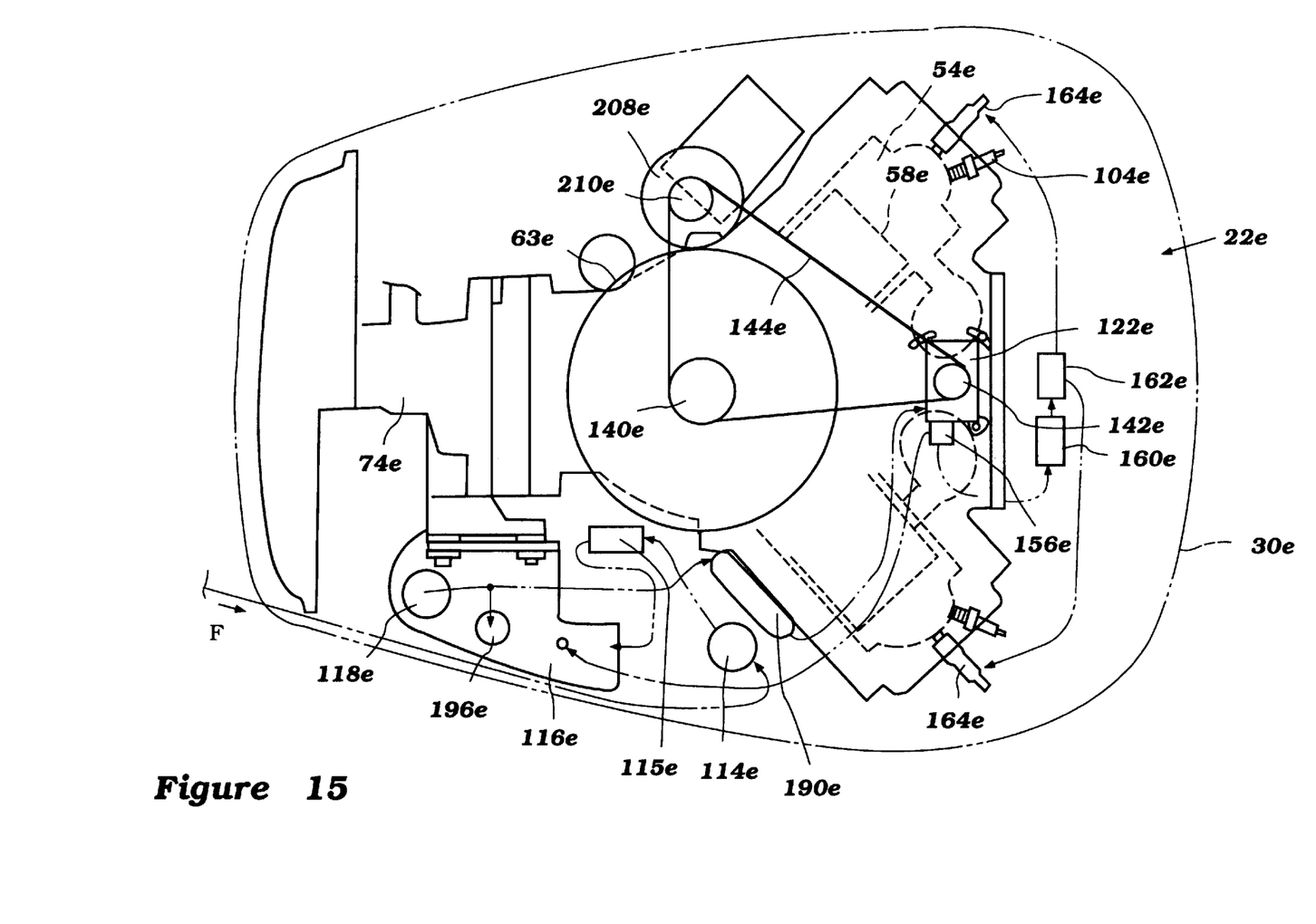
FIG. 15 is a top view of an engine positioned in a cowling (illustrated in phantom) of an outboard motor, the engine having a fuel supply system in accordance with a sixth embodiment of the present invention.

A sixth embodiment of the present invention is illustrated in FIG. 15. In the description and illustration of this embodiment, like reference numerals have been utilized for like parts to those of the embodiments described and illustrated above, except than an "e" designator has been added thereto.

In this embodiment, the drive for the pump 122e is combined with a drive of another engine feature, such as an alternator or generator 208e. As illustrated, the pump 122e is again mounted within the valley of the engine 22e. The generator 208e is mounted to one side of the engine 22e, and preferably opposite the vapor separator 116e. This provides a compact arrangement for the engine 22e within the cowling 30e of the motor 20e.

The drive belt 144c extends from the pulley 140e on the crankshaft to the pulley 142e on the shaft (not shown) driving the pump 122e. The belt 144e then extends to a pulley 210c of the generator 208e and then back to the crankshaft drive pulley 140e, in generally triangular arrangement. In accordance with this embodiment, a single drive provides the drive for the high pressure pump 122e of the fuel supply system and another component of the engine 20e, thus eliminating the need for another drive.

Figure 16:
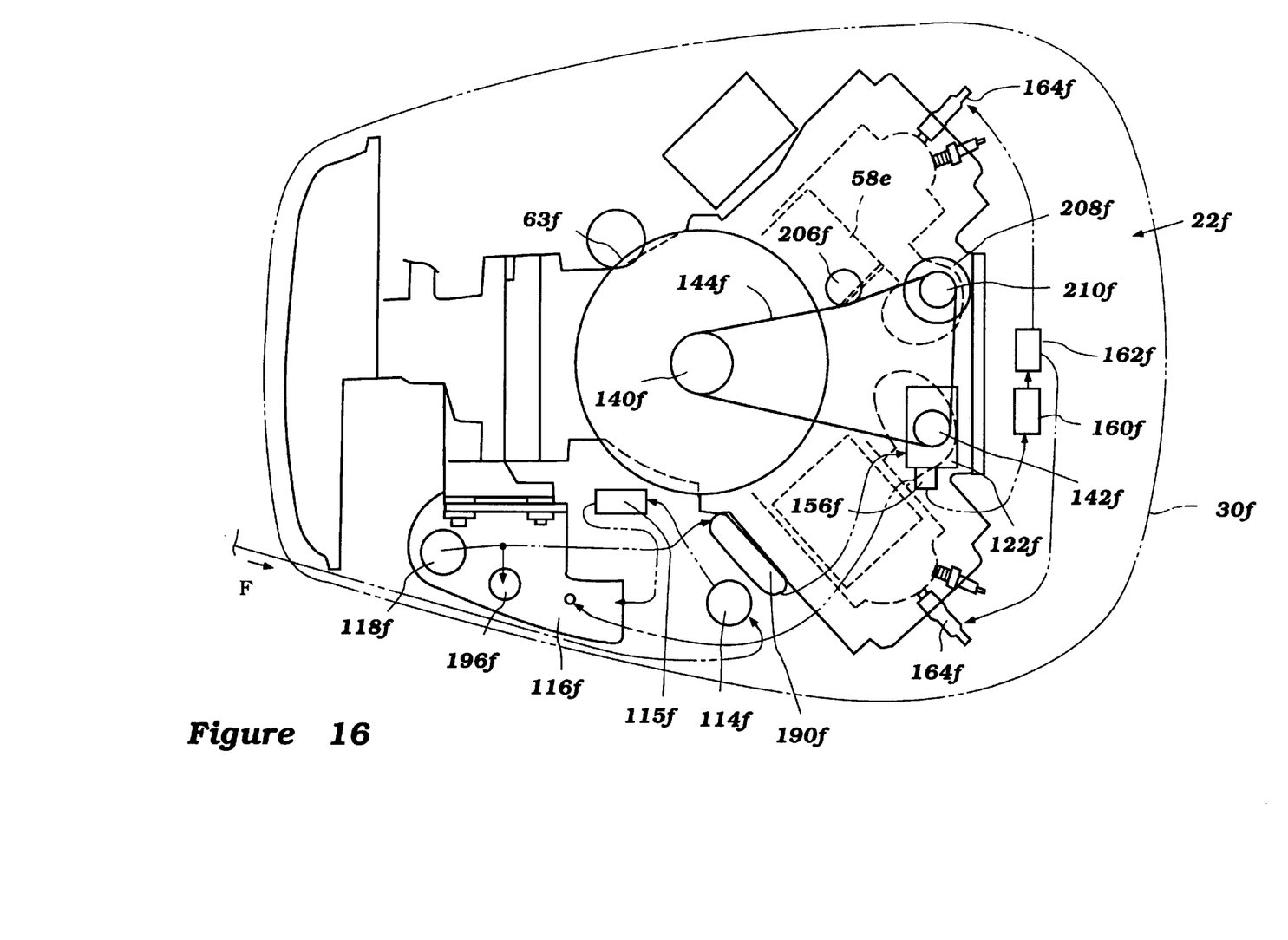
FIG. 16 is a top view of an engine positioned in a cowling (illustrated in phantom) of an outboard motor, the engine having a fuel supply system in accordance with a seventh embodiment of the present invention.

A seventh embodiment of the present invention is illustrated in FIG. 16. In the description and illustration of this embodiment, like reference numerals have been utilized for similar parts to those of the embodiments described and illustrated above, except than an "f" designator has been added thereto.

In this embodiment, the high pressure fuel pump 122f and at least one other engine component, such a generator 208f, are driven by the same drive mechanism. As with the last embodiment, in this embodiment, the single belt 144f is arranged to drive both of the pump 122f and generator 208f off of the crankshaft. A tensioner pulley 210f may be used in this arrangement to maintain the belt 144f taunt.

This arrangement has the similar advantage to that described above that a drive mechanism may be eliminated by the combination drive arrangement.

Figure 17:
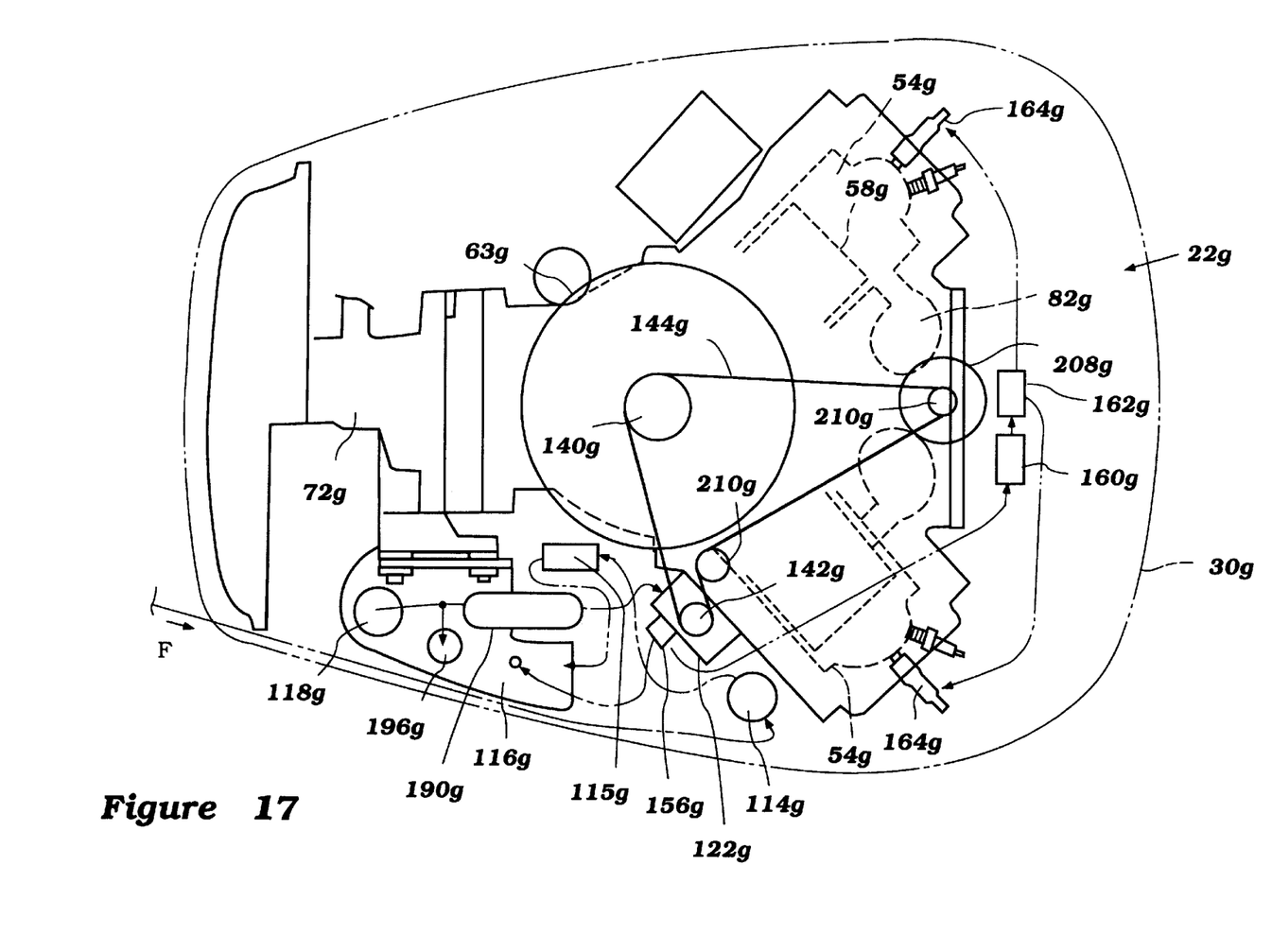
FIG. 17 is a top view of an engine positioned in a cowling (illustrated in phantom) of an outboard motor, the engine having a fuel supply system in accordance with a eighth embodiment of the present invention.

An eighth embodiment of the present invention is illustrated in FIG. 17. In the description and illustration of this embodiment, like reference numerals have been utilized for similar parts to those of the embodiments described and illustrated above, except than a "g" designator has been added thereto.

In this embodiment, the high pressure pump 122g of the fuel supply system is positioned on an outside of one of the cylinder banks near the vapor separator 116g. Another driven engine component, such as a generator 208g, is mounted in the valley defined between the cylinder banks of the engine 22g.

The belt 144g or other drive mechanism for the pump 122g is also used to drive the other engine component. In the embodiment illustrated, the drive belt 144g extends from the drive pulley 140g on the crankshaft to a pulley 210g of the generator 208, to a tensioner and guide pulley 210g and then around the pulley 142g driving the camshaft driving the pump 122g before returning to the drive pulley 144g on the crankshaft.

This arrangement has the similar benefit that a single drive arrangement is provided for driving both the pump 122g and another engine system. In addition, however, this arrangement provides for a very compact fuel supply system arrangement along one side of the engine 22g within the cowling 30g. This arrangement has the further benefit that the high pressure pump 122g, is positioned remotely from the exhaust passages 86g, thus reducing the heat transfer to the pump 122g and reducing harmful vapor production within the fuel system.

In the embodiments of the invention described above, it should be understood that the various fuel lines may comprise any number of materials as known to those skilled in the art. For example, the fuel lines may comprise rubber hose, metal piping, and even one or more passages formed within a portion of the engine such as the cylinder block.

Of course, the foregoing description is that of preferred embodiments of the invention, and various changes and modifications may be made without departing from the spirit and scope of the invention, as defined by the appended claims.

What is claimed is:

1. An engine having a fuel supply system, said engine having at least one cylinder, a piston movably mounted in the cylinder and connected to a crankshaft, a cooling jacket for cooling said engine, a coolant pump for circulating coolant through said engine cooling jacket, said fuel supply system including a solenoid operated fuel injector for injecting fuel into said cylinder and a high pressure fuel pump for delivering fuel from a fuel source to said fuel injector under high pressure, said high pressure fuel pump having a coolant system including a pump cooling jacket positioned externally of said engine cooling jacket and cooled by coolant circulated by said coolant pump.

2. An outboard motor comprised of a power head consisting of an internal combustion engine and a surrounding protective cowling and a driveshaft housing and lower unit containing a propulsion device within said lower unit depending from said power head, said engine being mounted within said protective cowling so that its crankshaft rotates about a vertically-extending axis, said crankshaft being coupled to a drive shaft that depends into said driveshaft housing and lower unit for driving said propulsion device, said engine being formed with at least one combustion chamber, a fuel injector for injecting fuel directly into said combustion chamber, a high pressure fuel pump contained within said protective cowling and having a pumping element reciprocating along a horizontal axis for pressurizing fuel for delivery to said fuel injector, a mechanical transmission for driving said pumping element from said crankshaft for delivering high pressure fuel to said fuel injector, said mechanical transmission comprising a rotating cam is fixed for rotation with a camshaft that is directly driven by the crankshaft through a flexible transmitter, and another engine accessory mounted externally of said engine and driven by said flexible transmitter.

\* \* \* \* \*